US007161956B2

(12) United States Patent
Gollamudi et al.

(10) Patent No.: US 7,161,956 B2
(45) Date of Patent: *Jan. 9, 2007

(54) ADAPATIVE QUALITY CONTROL LOOP FOR LINK RATE ADAPTATION IN DATA PACKET COMMUNICATIONS

(75) Inventors: Sridhar Gollamudi, Pine Brook, NJ (US); Pantelis Monogioudis, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1104 days.

This patent is subject to a terminal disclaimer.

(21) Appl. No.: 10/033,339

(22) Filed: Dec. 28, 2001

(65) Prior Publication Data

US 2003/0123477 A1 Jul. 3, 2003

(51) Int. Cl.
*H04J 3/22* (2006.01)
*H03M 13/00* (2006.01)

(52) U.S. Cl. ..................................... 370/468; 714/774
(58) Field of Classification Search ................ 370/310, 370/328, 465, 468, 477, 498; 714/774, 776
See application file for complete search history.

(56) References Cited

U.S. PATENT DOCUMENTS 5,479,447 A * 12/1995 Chow et al. ................. 375/260
5,488,609 A * 1/1996 Hluchyj et al. ............. 370/232
6,301,265 B1 * 10/2001 Kleider et al. .............. 370/465
6,639,934 B1 * 10/2003 Engstrom et al. ........... 375/130
2002/0193133 A1* 12/2002 Shibutani .................... 455/522
2003/0104831 A1* 6/2003 Razavilar et al. ........... 455/522
2004/0202196 A1* 10/2004 Sindhushayana et al. ... 370/465

* cited by examiner

*Primary Examiner*—Chau Nguyen
*Assistant Examiner*—Kerri M. Rose
(74) *Attorney, Agent, or Firm*—Jimmy Goo

(57) ABSTRACT

An adaptive quality control loop for link rate adaptation that adaptively selects optimal channel condition thresholds in real-time without measuring all the factors that affect selecting channel condition thresholds. The adaptive quality control loop involves adjusting the channel condition thresholds with variable up and down steps based on target quality metrics along with measurements such as error detection results, relative frequencies of visiting each modulation and/or coding schemes (also referred to as "MCS levels") and transmitted data rates. In one embodiment, the adaptive quality control loop comprises the step of adjusting a channel condition threshold based on a error detection result for a data packet transmission using a variable step. The channel condition threshold is associated with an MCS level used in the data packet transmission.

20 Claims, 3 Drawing Sheets

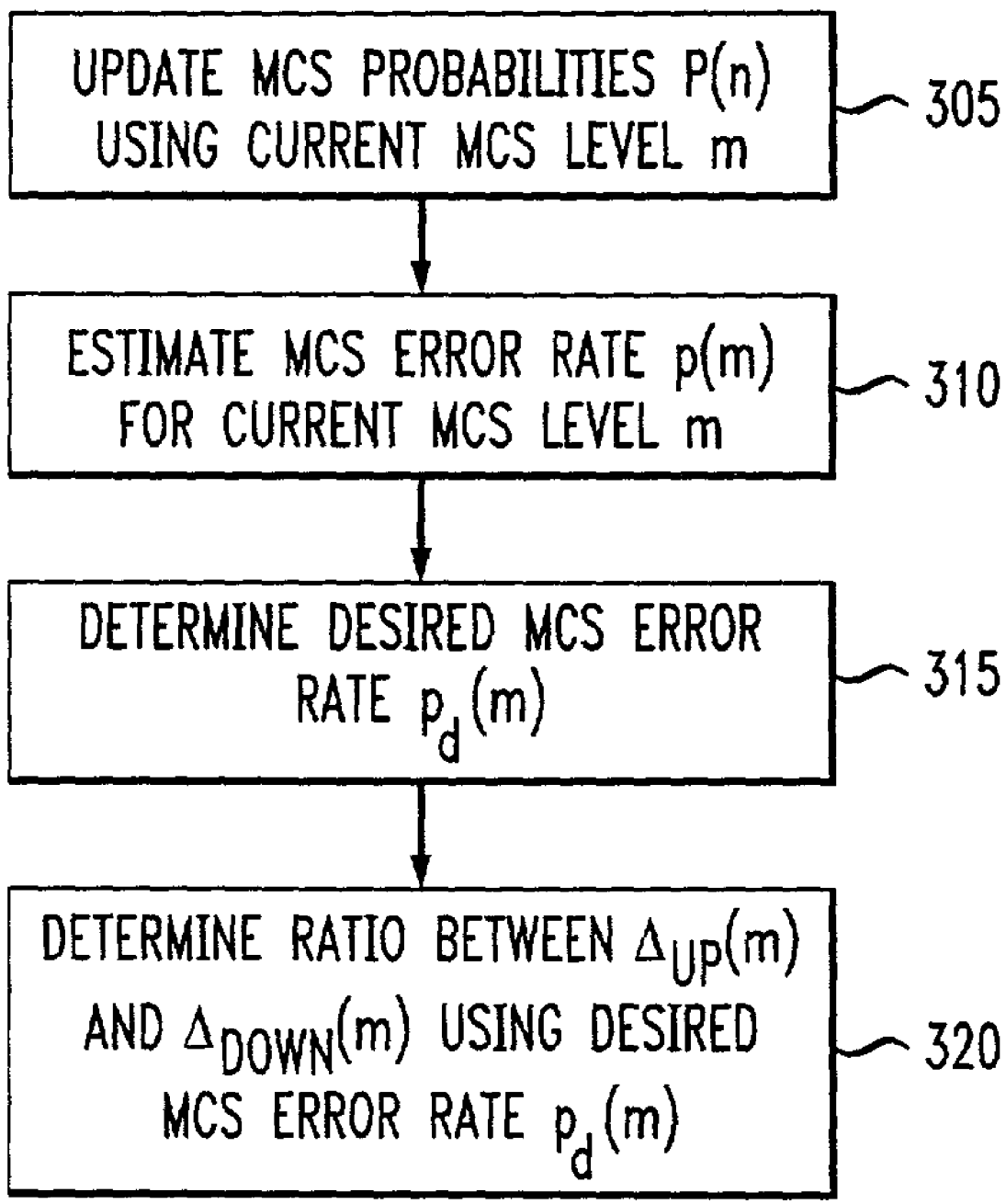

ADAPATIVE QUALITY CONTROL LOOP FOR LINK RATE ADAPTATION IN DATA PACKET COMMUNICATIONS

RELATED APPLICATION

Related subject matter is disclosed in the following applications filed concurrently and assigned to the same assignee hereof: U.S. Pat. No. 6,915,477 entitled, "DELAY SENSITIVE ADAPATIVE QUALITY CONTROL LOOP FOR RATE ADAPTATION," inventors Sridhar Gollamudi and Pantelis Monogioudis; and U.S. patent application Ser. No. 10/033,338 entitled, "MULTI-CHANNEL ADAPATIVE QUALITY CONTROL LOOP FOR RATE ADAPTATION IN DATA PACKET COMMUNICATION," inventors Sridhar Gollamudi and Pantelis Monogioudis.

FIELD OF THE INVENTION

The present invention relates generally to wireless data packet communications and, in particular, to performing quality control for wireless data packet communications.

BACKGROUND OF THE RELATED ART

In data packet communications over time-varying wireless communication channels, rate adaptation may be used to optimize data transmission. Rate adaptation is a technique that involves dynamically selecting a data rate for each packet of data to be transmitted based on a latest estimate of channel condition. Different data rates are associated with different modulation and/or channel coding schemes, also referred to herein as "MCS levels". High data rates are associated with higher order modulation and/or weaker channel coding schemes that provide less protection, such as redundancy, against channel error for the data packet being transmitted. By contrast, low data rates are associated with lower order modulation and/or stronger channel coding schemes that provide more protection against channel error for the data packet being transmitted.

The objective of rate adaptation is to select a data rate or an associated MCS level that would maximize data throughput without compromising data transmission quality. In good channel conditions, data transmission quality is less likely to be affected, thus a weaker MCS level may be selected to achieve a higher data rate. By contrast, in poor channel conditions, data transmission quality is more likely to be affected and a stronger MCS level should be selected to provide greater protection for the data packet being transmitted.

An MCS level (or data rate) is typically selected from a lookup table of MCS levels (or data rates) associated with channel conditions thresholds. In the lookup table, high or weak MCS levels and high channel condition thresholds are associated with high data rates. Similarly, low or strong MCS levels and low channel condition thresholds are associated with low data rates. The channel conditions between a transmitter and a receiver are estimated at the receiver using any channel quality metric, such as carrier to interference (C/I) ratio, signal to interference plus noise ratio (SINR) or Shannon capacity. The estimate of channel condition is subsequently relayed, via a feed back channel, to the transmitter. The transmitter uses the estimate of channel condition and lookup table to select an MCS level at which the transmitter is to transmit data packets to the receiver. In order to maximize data throughput, the MCS level selected should be the MCS level associated with the highest channel condition threshold which the estimate of channel condition satisfies. A channel condition threshold is satisfied when the estimate of channel condition is greater or equal to the channel condition threshold. The selected MCS level is communicated to the receiver by the transmitter before any data packet is transmitted. Alternately, the receiver selects the MCS level and relays, via the feedback channel, the selected MCS level to the transmitter.

The choice of channel condition thresholds in the lookup table can significantly affect link performance criteria, such as average throughput, packet and bit error rates and average number of retransmissions with ARQ, HARQ or similar error correction schemes. Optimal choice of channel condition thresholds are based on a complicated function of several factors such as metric estimation accuracy, Doppler frequency of the channel, feedback delay, fading statistics and SINR at the receiver, channel profile, choice of MCS levels, and transmitter and receiver design. Most of these factors are, however, time varying which would, in turn, cause the optimal channel condition thresholds to be time varying. Thus, it would be more desirable for a lookup table having channel condition thresholds that are adaptive as time varies (i.e., adaptive lookup table) than a lookup table having fixed channel condition thresholds (i.e., fixed lookup table). One way of implementing an adaptive lookup table involves measuring the above mentioned factors in real-time, calculating a set of optimized channel condition thresholds based on those factors and updating the adaptive lookup table with the set of optimized channel condition thresholds. However, due to the large number of factors affecting the optimal channel condition thresholds, it would be impractical to implement an adaptive lookup table in this manner. Accordingly, there exists a need for adaptively selecting channel condition thresholds in real-time without measuring all the factors that affect optimal channel condition thresholds.

SUMMARY OF THE INVENTION

The present invention is an adaptive quality control loop for link rate adaptation that adaptively selects optimal channel condition thresholds in real-time without measuring all the factors that affect selecting channel condition thresholds. The adaptive quality control loop involves adjusting the channel condition thresholds with variable up and down steps based on target quality metrics along with measurements such as error detection results, relative frequencies of visiting each modulation and/or coding schemes (also referred to as "MCS levels") and transmitted data rates. In one embodiment, the present invention comprises the step of adjusting a channel condition threshold based on a error detection result for a data packet transmission using a variable step. The channel condition threshold is associated with an MCS level used in the data packet transmission.

BRIEF DESCRIPTION OF THE DRAWINGS

The features, aspects, and advantages of the present invention will become better understood with regard to the following description, appended claims, and accompanying drawings where:

FIG. 3 depicts a flowchart illustrative of one embodiment of determining variable up steps $\Delta_{Up}$ (n) and down steps $\Delta_{Down}$ (n) using modulation and/or coding schemes (MCS) probabilities P(n) and MCS error rate p(n).

DETAILED DESCRIPTION

The present invention is an adaptive quality control loop for link rate adaptation that adaptively selects channel condition thresholds in real-time without measuring all the factors that affect selecting channel condition thresholds. The adaptive quality control loop involves adjusting the channel condition thresholds with variable up and down steps based on target quality metrics along with measurements such as error detection results, relative frequencies of visiting each modulation and/or coding schemes (also referred to as "MCS levels") and transmitted data rates.

Figure 1:
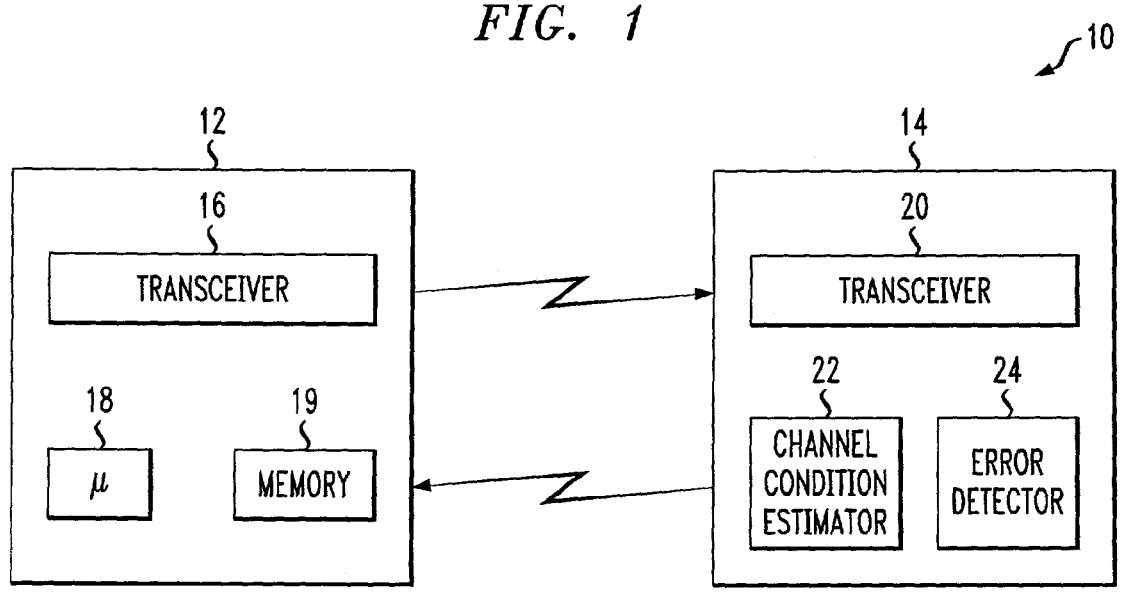
FIG. 1 depicts a wireless communication system used in accordance with the present invention.

FIG. 1 depicts a wireless communication system 10 used in accordance with the present invention. Wireless communication system 10 incorporates a multiplexing scheme, such as code division multiple access (CDMA), time division multiple access (TDMA), etc. Wireless communication system 10 comprises a transmitter 12 and a receiver 14. Transmitter 12 includes a transceiver 16 for transmitting and receiving data over an air interface, and a processor 18 with associated memory 19 for determining a particular MCS level at which to transmit data packet. Receiver 14 includes a transceiver 20 for receiving and transmitting data over an air interface, a channel condition estimator 22 for estimating channel conditions between transmitter 12 and receiver 14, and an error detector 24 for detecting error in received data packet. Note that processor 18 and memory 19 may, alternately, be parts of receiver 14 or of an independent entity in communication with both receiver 14 and transmitter 12. Thus, the present invention should not be limited to a wireless communication system in which processor 18 and memory 19 are parts of transmitter 12.

Figure 2:
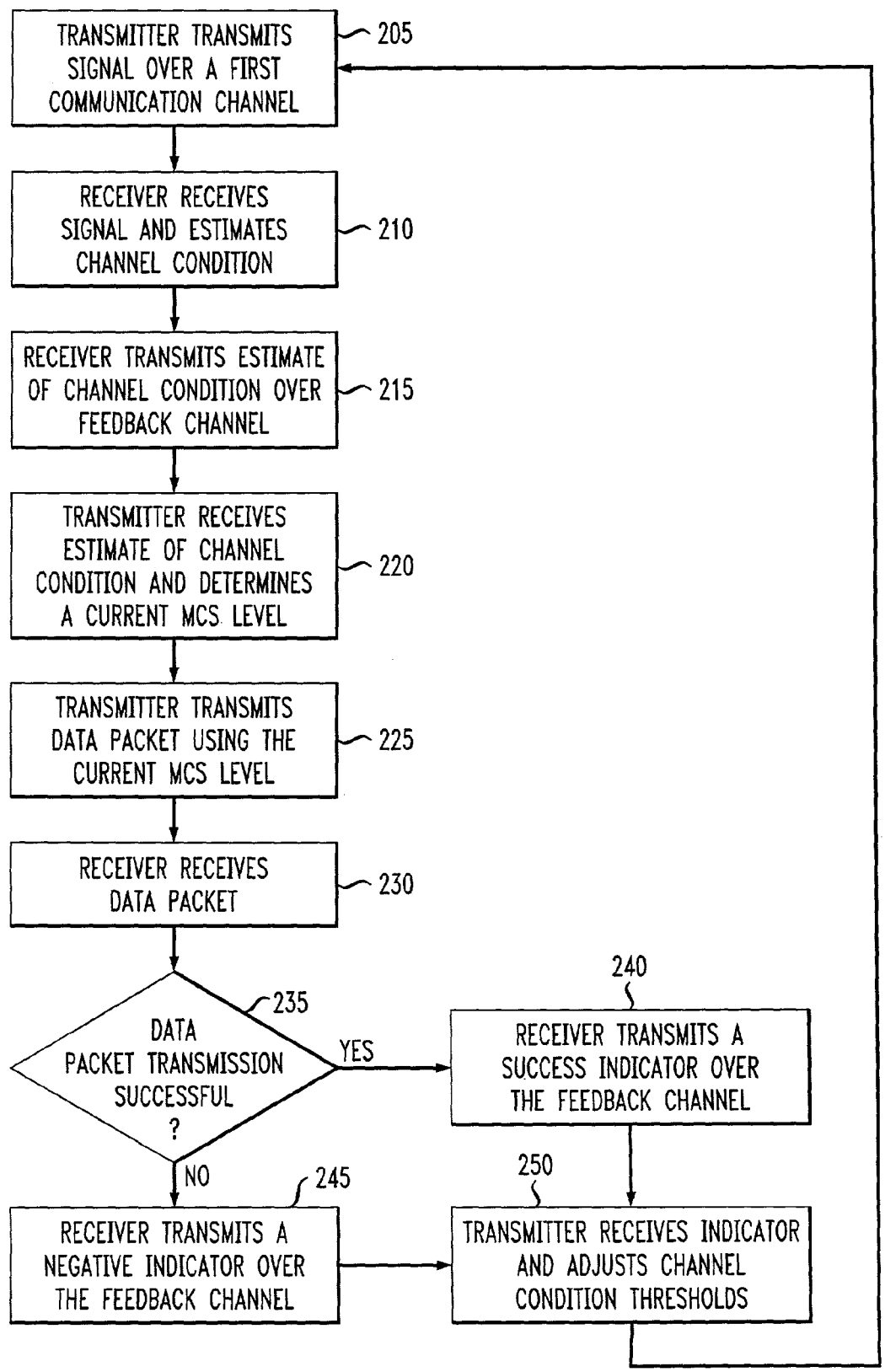
FIG. 2 depicts a flowchart illustrative of an adaptive quality control loop in accordance with one embodiment of the present invention.

FIG. 2 depicts a flowchart 200 illustrative of an adaptive quality control loop in accordance with one embodiment of the present invention. In step 205, transmitter 12 transmits a signal over a first communication channel, wherein the signal may be any signal which channel condition estimator 22 can use to estimate channel conditions between transmitter 12 and receiver 14, such as a pilot signal or beacon frequency signal. In step 210, receiver 14 receives the signal and channel condition estimator 22 estimates the channel condition between transmitter 12 and receiver 14 using the received signal. The estimate of channel condition is transmitted by receiver 14, in step 215, over a feedback channel to transmitter 12.

In step 220, transmitter 12 receives the estimate of channel condition and processor 18 uses such estimate to determine a current MCS level m (or data rate). In one embodiment, the current MCS level m is selected from a table of MCS levels n stored in memory 19, where $1 \leq n, m \leq M$. Each of the MCS levels n correspond to a channel condition threshold θ(n). Higher or weaker MCS levels n are associated with higher channel condition thresholds θ(n) and data rates, whereas lower or stronger MCS levels n are associated with lower channel condition thresholds θ(n) and data rates. For channel conditions greater than or equal to a particular channel condition threshold θ(n), a data packet can probably be reliably transmitted to receiver 14 using the MCS levels n associated with that particular or lower channel condition threshold θ(n). For example, if the estimate of channel condition is greater than channel condition threshold θ(3), then a data packet can deem to be reliably transmittable using MCS level 3, 2 and 1. Preferably, processor 18 selects the MCS level n associated with the highest channel condition threshold θ(n) which the estimate of channel condition satisfies, i.e., is greater than or equal to, as the current MCS level m.

Channel condition threshold θ(n) may, in one embodiment, be initially determined based on a complex function of several factors such as metric estimation accuracy, Doppler frequency of the channel, feedback delay, fading statistics and SINR at the receiver, channel profile, choice of MCS levels, and transmitter and receiver design, as is well-known in the art.

In step 225, transmitter 12 transmits data packet to receiver 14 using the current MCS level m over the first communication channel or another communication channel. In step 230, receiver 14 receives the data packet. In step 235, error detector 24 determines whether the data packet transmission was successful, i.e., data packet could be successfully decoded at receiver 14 to obtain an error detection result. In one embodiment, error detector 24 performs a cyclical redundancy check (CRC) on the data packet, as is well-known in the art. If the CRC is successful, then error detector 24 determines that the error detection result is positive, i.e., data packet transmission was successful. If the CRC fails, then error detector 24 determines that the error detection result is negative, i.e., data packet transmission failed.

If error detector 24 detects a successful data packet transmission, then receiver 14 transmits a success indicator over the feedback channel (or some other communication channel) to transmitter 12 indicating a positive error detection result, in step 240. If error detector 24 detects a failed data packet transmission, then receiver 14 transmits a failure indicator over the feedback channel (or some other communication channel) to transmitter 12 indicating a negative error detection result, in step 245.

From step 240 or 245, flowchart 200 proceeds to step 250 where processor 18 updates channel condition threshold θ(m) and, perhaps, channel condition thresholds θ(m) in the table in memory 19 before returning to step 205. Note that a re-transmission of a data packet may occur at a MCS level different from the preceding transmission of the same data packet if the channel condition changes.

Updating channel condition threshold θ(m) (or other channel condition thresholds θ(n)) involves the following. Generally, if a success indicator is received, the channel condition threshold θ(m) associated with the current MCS level m is decreased a down step $\Delta_{Down}$ (m), i.e., the channel condition threshold θ(m) is lowered. By contrast, if a failure indicator is received, the channel condition threshold θ(m) associated with the current MCS level m is increased an up step $\Delta_{Up}$ (m), i.e., the channel condition threshold θ(m) is increased. In addition to adjusting the channel condition threshold θ(m) of the current MCS level m, the channel condition thresholds θ(n) of other MCS levels n may also be adjusted, as will be described herein. Note that, when increasing or decreasing channel condition thresholds θ(n), the channel condition thresholds being increased or decreased should not be increased above or decreased below their adjacent channel condition thresholds. That is, for example, channel condition threshold θ(2) should not be decreased below channel condition threshold θ(1) nor increased above channel condition threshold θ(3).

Many variations of the up step $\Delta_{Up}$ and down step $\Delta_{Down}$ may exist for the present invention. Some of these variations will be described herein. This should not, however, be construed to be inclusive of all possible variations of up steps $\Delta_{Up}$ and down steps $\Delta_{Down}$ for the present invention. The down step $\Delta_{Down}$ (m) for channel condition threshold θ(m) may be equal to or different from the up step $\Delta_{Up}$ (m) for the same channel condition threshold θ(m). The up step $\Delta_{Up}$ (n) and down step $\Delta_{Down}$ may be the same, different or some combination thereof across all channel condition thresholds θ(n). For example, the up step $\Delta_{Up}$ (1) for channel condition threshold θ(1) may be the same or different than the up step $\Delta_{Up}$ (2) for channel condition threshold θ(2).

The up steps $\Delta_{Up}$ (n) and down steps $\Delta_{Down}$ (n) may be of fixed or variable sizes for a particular or all channel condition thresholds θ(n). In one embodiment, channel condition thresholds θ(n) are adaptively adjusted using variable up steps $\Delta_{Up}$ (n) and down steps $\Delta_{Down}$ (n). The variable up steps $\Delta_{Up}$ (n) and down steps $\Delta_{Down}$ (n) may be determined in a variety of manners. FIG. 3 depicts a flowchart 300 illustrative of one embodiment of determining variable up steps $\Delta_{Up}$ (n) and down steps $\Delta_{Down}$ (n) using MCS probabilities P(n) for choosing a particular MCS level n and MCS error rates p(n). The MCS probability P(n) for choosing a particular MCS level n is the probability that a data packet is transmitted with that MCS level n to a particular receiver. In other words, it is the fraction of times that MCS level n is selected for data packet transmission to a particular receiver. The MCS error rate p(n) is the probability that a data packet transmitted using MCS level n would not be received successfully by a particular receiver In step 305, MCS probabilities P(n) for MCS levels n for receiver 14 are updated using the current MCS level m. In one embodiment, MCS probabilities P(n) are estimated using simple averaging. For example, suppose there are three MCS levels 1, 2 and 3, and MCS levels 1, 2 and 3 were chosen 3, 4 and 2 times, respectively, prior to choosing the current MCS level m. The MCS probabilities prior to the selection of the current MCS level m would then be estimated to be P(1)=0.33, P(2)=0.44 and P(3)=0.22. If the current MCS level m is 1, then the MCS probabilities P(n) would be updated such that P(1)=0.40, P(2)=0.40 and P(3)=0.20.

In another embodiment, MCS probabilities P(n) are estimated using exponential averaging. Specifically, the MCS probabilities P(n) are estimated using equation (1):

$$P(n) = \begin{cases} \lambda P'(n) + (1-\lambda) & \text{if } n = m \\ \lambda P'(n) & \text{otherwise} \end{cases} \quad \text{equation (1)}$$

where λ is a forgetting factor that is between 0 and 1 (usually closer to 1) and prime ' indicates the previous value of the associated parameter prior to update. The forgetting factor is a factor used to compute an average of a sequence of observations when the average itself is a slowly varying quantity, as is well-known in the art. The MCS probabilities P(n) may be estimated using other averaging schemes, such as computing an average over a sliding window. Thus, the present invention should not be limited to the above described techniques for estimating MCS probabilities P(n).

In step 310, MCS error rate p(m) for the current MCS level m is estimated. In one embodiment, MCS error rate P(m) is estimated using simple averaging. For example, if 50% of the data packet sent with MCS level 3 have CRC failures, then the MCS error rate for level 3 is p(3)=0.5. In another embodiment, MCS error rate p(m) is estimated using exponential averaging. Specifically, MCS error rate p(m) is estimated using equation (2).

$$p(m) = \begin{cases} \lambda p'(m) + (1-\lambda) & \text{if } CRC \text{ fails} \\ \lambda p'(m) & \text{if } CRC \text{ succeeds} \end{cases} \quad \text{equation (2)}$$

The MCS error rate p(m) may be estimated using other averaging schemes, such as computing an average over a sliding window. Thus, the present invention should not be limited to the above described techniques for estimating the MCS error rate p(m). Note that, in step 310, only the MCS error rate p(m) for the current MCS level m is estimated, and not MCS error rate p(n) for all MCS levels n. The reason for not updating the MCS error rate p(n) for other MCS levels n is because no new information is available at this time for the other MCS levels n. It should be understood that estimates for MCS error rates p(n) of MCS levels n other than MCS level m also exist.

In step 315, a desired MCS error rate p(m), denoted hereinafter as $p_d(m)$, is computed for current MCS level m, wherein the desired MCS error rate $p_d(m)$ would meet a target criterion. The desired MCS error rate $p_d(m)$ can either be computed using a target criterion based on a block error rate (BLER) or bit error rate (BER). An overall BLER, hereinafter denoted as $P_{BLER}$, is the rate of data packet or block errors, i.e., CRC errors, averaged over all MCS levels n. $P_{BLER}$ can be determined using equation (3)

$$P_{BLER} = \sum_{n=1}^{M} p(n)P(n) \quad \text{equation (3)}$$

where M is the total number of MCS levels.

An overall BER, hereinafter denoted as $P_{BER}$, is the rate of bit errors averaged over all MCS levels n. The number of bits in a data packet being determinative of $P_{BER}$. If a data packet is successfully decoded, then all bits are deemed successfully transmitted. If a data packet is not successfully decoded, then all bits are deemed to have been unsuccessfully transmitted. Thus, if a data packet with a large number of data bits can not be successfully decoded, such would increase $P_{BER}$ more than if a data packet with a smaller number of data bits can not be successfully decoded. By contrast, the number of data bits in a data packet is irrelevant from the perspective of determining $P_{BLER}$. $P_{BER}$ can be determined using equation (4), $$P_{BER} = \frac{\sum_{n=1}^{M} R(n)p(n)P(n)}{\sum_{n=1}^{M} R(n)P(n)} \quad \text{equation (4)}$$

where R(n) is the averaged transmitted data rate for MCS level n.

If the target criterion for the desired MCS error rate $p_d(m)$ is based on a constant target $$BLER\ P_{BLER}^{Target},$$

then the desired MCS error rate $p_d(m)$ is determined using equation (5).

$$p_d(m) = \frac{1}{P(m)}\left[P_{BLER}^{Target} - \sum_{n=1, n \neq m}^{M} p(n)P(n)\right] \quad \text{equation (5)}$$

If the target criterion is based on a constant target $$BER\ P_{BER}^{Target},$$

then the desired MCS error rate $p_d(m)$ is determined using equation (6).

$$p_d(m) = \frac{1}{R(m)P(m)}\left[P_{BER}^{Target} - \sum_{n=1}^{M} R(n)P(n) - \sum_{n=1, n \neq m}^{M} R(n)p(n)P(n)\right] \quad \text{equation (6)}$$

In step 320, the desired MCS error rate $p_d(m)$, whether based on BLER or BER, is used to determine a ratio between the sizes of the down step $\Delta_{Down}$ (m) and $\Delta_{Up}$ step $\Delta_{Up}$ (m) for the current MCS level m. In one embodiment, the up-to-down step ratio for the current MCS level m is set to satisfy equation (7).

$$\frac{\Delta_{Up}(m)}{\Delta_{Down}(m)} = \frac{1 - p_d(m)}{p_d(m)} \quad \text{equation (7)}$$

Alternatively, the sizes for the up step $\Delta_{Up}$ and down step $\Delta_{Down}$ may be determined using equations (8) and (9), respectively:

$$\Delta_{Up}(m) = \mu(1 - p_d(m)) \quad \text{equation (8)}$$

$$\Delta_{Down}(m) = \mu p_p(m) \quad \text{equation (9)}$$

where $\mu$ is a positive constant.

Another embodiment of determining variable up steps $\Delta_{Up}$ (n) and down steps $\Delta_{Down}$ (n) is applicable if the relative positions of the channel condition thresholds are unchanged, i.e., if at every update instant the same up and down steps are applied to all thresholds. In this embodiment, the variable up steps $\Delta_{Up}$ (n) and down steps $\Delta_{Down}$ (n) are determined based a constant target $$BER\ P_{BER}^{Target}$$

and average transmitted data rates R(n) using equations (10) and (11).

$$\Delta_{Up}(n) = \mu R(n)(1 - P_{BER}^{Target}) \quad \text{equation (10)}$$

$$\Delta_{Down}(n) = \mu R(n) P_{BER}^{Target} \quad \text{equation (11)}$$

Alternately, a constant target $$BLER\ P_{BLER}^{Target}.$$

may be used instead of the constant target $$BER\ P_{BER}^{Target}.$$

The up step $\Delta$Up (m) and down step $\Delta_{Down}$ (m) are used accordingly in step 250 to adjust the corresponding channel condition threshold $\theta(m)$. In one embodiment, only the channel condition threshold $\theta(m)$ for the current MCS level m is adjusted in step 250. In another embodiment, one or more other channel condition thresholds $\theta(n)$ for MCS levels n other than MCS level m are also adjusted. For example, the other channel condition thresholds $\theta(n)$ being adjusted are adjusted the same amount as channel condition threshold $\theta(m)$ such that the relative distance between the channel condition thresholds $\theta(n)$ being adjusted, including channel condition threshold $\theta(m)$, remain fixed. Alternately, the other channel condition thresholds $\theta(n)$ are adjusted using up steps $\Delta_{Up}$ (n) and down steps $\Delta_{Down}$ (n) determined separately from up step $\Delta_{Up}$ (m) and down step $\Delta_{Down}$ (m).

The present invention has been described herein with reference to certain embodiment. This should not be construed to limit the present invention to the embodiments described herein. For example, the flowcharts depict an exact sequence of steps for use in the present invention. The sequence of steps may vary such as, in another embodiment of flowchart 200, steps 205, 210, 215 and 220 may be executed as a part of steps 225, 230–235, 240–245 and 250, respectively. Therefore, the spirit and scope of the present invention should not be limited to the description of the embodiments contained herein.

We claim:

1. An adaptive quality control loop for rate adaptation comprising in the step of:
adjusting a first channel condition threshold based on a first error detection result for a first data packet transmission between a transmitter and a receiver using a first variable step, wherein the first channel condition threshold is associated with a first modulation and coding scheme (MCS) level used in the first data packet transmission.

2. The adaptive quality control loop of claim 1, wherein the step of adjusting the first channel condition threshold comprises the step of:
determining the first variable step using a desired MCS error rate for the first MCS level.

3. The adaptive quality control loop of claim 2, wherein the step of determining the first variable step comprises the step of:
updating MCS probabilities for all MCS levels using the first error detection result;

updating an MCS error rate for the first MCS level; and
determining a ratio between a first variable up step and a first variable down step associated with the first variable step using the updated MCS probabilities, MCS error rate and a target criterion.

4. The adaptive quality control loop of claim 2, wherein the desired MCS error rate for the first MCS level is based on a block error rate target criterion.

5. The adaptive quality control loop of claim 2, wherein the desired MCS error rate for the first MCS level is based a block error rate target criterion, MCS probabilities for the first MCS level and for other MCS levels, and MCS error rates for the other MCS levels.

6. The adaptive quality control loop of claim 5, wherein the desired MCS error rate is determined by solving $$p_d(m) = \frac{1}{P(m)}\left[P_{BLER}^{Target} - \sum_{n=1,n\neq m}^{M} p(n)P(n)\right]$$

where $p_d(m)$ is the desired MCS error rate, P(m) is the MCS probability for the first MCS level, $$P_{BLER}^{Target}$$

is the block error rate target criterion, p(n) is the MCS error rates for a particular MCS level n, and P(n) is the MCS probability for a particular MCS level n.

7. The adaptive quality control loop of claim 5, wherein the desired MCS error rate is determined by solving $$p_d(m) = \frac{1}{R(m)P(m)}\left[P_{BER}^{Target}\sum_{n=1}^{M} R(n)P(n) - \sum_{n=1,n\neq m}^{M} R(n)p(n)P(n)\right]$$

where $p_d(m)$ is the desired MCS error rate, P(m) is the MCS probability for the first MCS level, $$P_{BER}^{Target}$$

is the bit error rate target criterion, p(n) is the MCS error rate for a particular MCS level n, R(m) is the data rate for the first MCS level, R(n) is the average transmitted data rate for a particular MCS level n, and P(n) is the MCS probability for a particular MCS level n.

8. The adaptive quality control loop of claim 2, wherein the desired MCS error rate for the first MCS level is based on a bit error rate target criterion.

9. The adaptive quality control loop of claim 2, wherein the desired MCS error rate for the first MCS level is based a bit error rate target criterion, MCS probabilities for the first MCS level and for other MCS levels, data rates for the first MCS level and for the other MCS levels, and MCS error rates for the other MCS levels.

10. The adaptive quality control loop of claim 1, wherein the step of adjusting the first channel condition threshold comprises the step of:
determining the first variable step using a block or bit error rate target criterion and a first data rate associated with the first MCS level.

11. The adaptive quality control loop of claim 1, wherein the first variable step is associated with a first variable up step and a first variable down step, the first channel condition threshold being increased an amount based on the first variable up step if the first error detection result indicates the first data transmission was unsuccessful, the first channel condition threshold being decreased an amount based on the first variable down step if the first error detection result indicates the first data transmission was successful.

12. The adaptive quality control loop of claim 11, wherein a ratio between the first variable up and down steps satisfy $$\frac{\Delta_{Up}(m)}{\Delta_{Down}(m)} = \frac{1-p_d(m)}{p_d(m)}$$

where $\Delta_{Up}$ (m) is the first variable up step for the first MCS level, $\Delta_{Down}$ (m) is the first variable down step for the first MCS level, and $p_d$(m) is a desired MCS error rate for the first MCS level.

13. The adaptive quality control loop of claim 11, wherein the first variable up and down steps are determined by solving $$\Delta_{Up}(m)=\mu(1-p_d(m))$$

$$\Delta_{Down}(m)=\mu p_d(m)$$

where $\Delta_{Up}$ (m) is the first variable up step for the first MCS level, $\Delta_{Down}$ (m) is the first variable down step for the first MCS level, μ is a positive constant, and $p_d$(m) is a desired MCS error rate for the first MCS level.

14. The adaptive quality control loop of claim 11, wherein a ratio between the first variable up step and first variable down step are based on a desired MCS error rate for the first MCS level.

15. The adaptive quality control loop of claim 1 comprising the additional steps of:
adjusting a second channel condition threshold based on a second error detection result for a second data packet transmission using a second variable step, wherein the second first channel condition threshold is associated with a second MCS level used in the second data packet transmission.

16. The adaptive quality control loop of claim 15, wherein the first variable step is based on the first error detection result and the second variable step is based on the second error detection result.

17. The adaptive quality control loop of claim 1 comprising the additional steps of:
selecting a second MCS level based on an estimate of channel condition between the receiver and transmitter using a table having the adjusted first channel condition threshold.

18. The adaptive quality control loop of claim 17 comprising the additional steps of:
transmitting a second data packet using the second MCS level.

19. The adaptive quality control loop of claim 1, wherein the step of adjusting the first channel condition threshold is performed at the receiver.

20. The adaptive quality control loop of claim 1, wherein the step of adjusting the first channel condition threshold is performed at the transmitter.

* * * * *